(12) United States Patent
Rajamony et al.

(10) Patent No.: US 7,089,282 B2
(45) Date of Patent: Aug. 8, 2006

(54) DISTRIBUTED PROTOCOL PROCESSING IN A DATA PROCESSING SYSTEM

(75) Inventors: Ramakrishnan Rajamony, Austin, TX (US); Eric Van Hensbergen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 10/210,360

(22) Filed: Jul. 31, 2002

(65) Prior Publication Data

US 2004/0024893 A1    Feb. 5, 2004

(51) Int. Cl.
G06F 15/16    (2006.01)

(52) U.S. Cl. ............... 709/203; 709/216; 709/223; 709/235

(58) Field of Classification Search ............ 709/201, 709/202, 203, 205, 212, 213–216, 223, 235
See application file for complete search history.

(56) References Cited

U.S. PATENT DOCUMENTS

| | | | | |
|---|---|---|---|---|
| 5,655,082 | A * | 8/1997 | Umekita et al. | 709/213 |
| 5,678,060 | A * | 10/1997 | Yokoyama et al. | 709/212 |
| 5,913,028 | A * | 6/1999 | Wang et al. | 709/203 |
| 6,038,621 | A * | 3/2000 | Gale et al. | 710/56 |
| 6,735,620 | B1 * | 5/2004 | Blackmore et al. | 709/212 |
| 6,754,724 | B1 * | 6/2004 | Horikawa et al. | 710/8 |
| 6,792,505 | B1 * | 9/2004 | Otterness et al. | 711/114 |
| 6,799,200 | B1 * | 9/2004 | Blackmore et al. | 709/212 |
| 6,886,086 | B1 * | 4/2005 | Kobayashi et al. | 711/162 |
| 6,920,484 | B1 * | 7/2005 | Alfieri et al. | 709/212 |

* cited by examiner

*Primary Examiner*—Zarni Maung
*Assistant Examiner*—Van Nguyen
(74) *Attorney, Agent, or Firm*—Joseph P. Lally; Casimer K. Salys

(57) ABSTRACT

A data processing system suitable for transmitting and receiving data packets via a network including a first processing entity and a second processing entity both having access to system memory data subject to transmission over the network after being formatted according to a network communication protocol. The first processing entity performs a first portion of the network communication protocol, such as a flow control portion, while the second processing entity performs a second portion of the protocol, such as acknowledgement handling or data retrieval. The first processing entity is typically a central processing unit of a network server while the second processing entity is typically a network communication device. The first and second processing entities may reside on a single physical system or on physically distinct systems connected via a switched bus I/O architecture. The acknowledgement handling portion of the protocol may include reclamation of memory corresponding to an acknowledged packet where the memory resides on a system memory or on memory local to the second processing entity.

19 Claims, 3 Drawing Sheets

DISTRIBUTED PROTOCOL PROCESSING IN A DATA PROCESSING SYSTEM

BACKGROUND

1. Field of the Present Invention

The present invention generally relates to the field of data processing networks and more particularly to a system and method in which network protocol processing is distributed between multiple processing entities to improve efficiency.

2. History of Related Art

In the field of data processing networks, network overhead is consuming an increasingly large percentage of system resources. Network overhead includes, among other items, the overhead associated with the construction of network packets. More specifically, data processing networks almost universally employ some form of multi-layered network protocol to facilitate communication among unlike systems and platforms. Perhaps the most widely implemented of such network protocols includes the Transmission Control Protocol (TCP) and the Internet protocol (IP), which provide the backbone for a large number of data processing networks including the Internet.

When coupled with high-bandwidth network connections, network protocol processing imposes a significant overhead on a host system. The problem is frequently aggravated by the need for data originating from the server. In many cases, the data required to fulfill a network request resides in the system memory of the server. In a conventional server environment, the protocol processing is tightly bound to the server's central processing unit such that, in addition to determining the appropriate headers, the CPU is also responsible for retrieving the required data from memory and "assembling" the header and data into a properly formatted packet. By imposing the entire network communication overhead on a single processing entity such as the system's CPU, the conventional network data processing system requires an undesirably disproportionate amount of time just to maintain the network connection. It would be desirable to implement a system and method in which protocol processing is distributed among various processing entities in the system to achieve greater efficiency and performance without substantially altering the hardware.

SUMMARY OF THE INVENTION

The problems identified above are in large part addressed by a data processing system and method according to the present invention in which network protocol processing is performed by various processing entities within a system or collection of systems to reduce overhead on the system's central processing unit. In one embodiment, the data processing system includes at least first and second data processing entities. Each processing entity is capable of performing typical processing functions such as load/store, arithmetic calculations, and branch decisions. In one embodiment, the first processing entity is a central processing unit (CPU) and the second processing entity is a processor component of the system's network communication device, also referred to as a network interface card or NIC. In this embodiment, the NIC typically includes, in addition to the processing entity, its own randomly accessible memory and direct access to the data processing system's system memory (i.e., the NIC can access memory without intervention of the CPU).

The first processing entity is responsible for a first portion of the network communication process while the second processing entity is responsible for a second portion. In one embodiment optimized for the capabilities of the various processing entities, the CPU is typically responsible for network communication flow control, while the NIC is responsible for data transmission. In this embodiment, the CPU can maintain flow control in the context of numerous other processes that may be operating on the system while the NIC is delegated the task of retrieving and managing data stored in memory. More specifically, the CPU conveys the header portion of the packet to the NIC and delegates to it the tasks of assembling the packet (using data stored in memory) and storage reclamation (when the receiver acknowledges reception of the packet).

BRIEF DESCRIPTION OF THE DRAWINGS

Other objects and advantages of the invention will become apparent upon reading the following detailed description and upon reference to the accompanying drawings in which.

Figure 1:
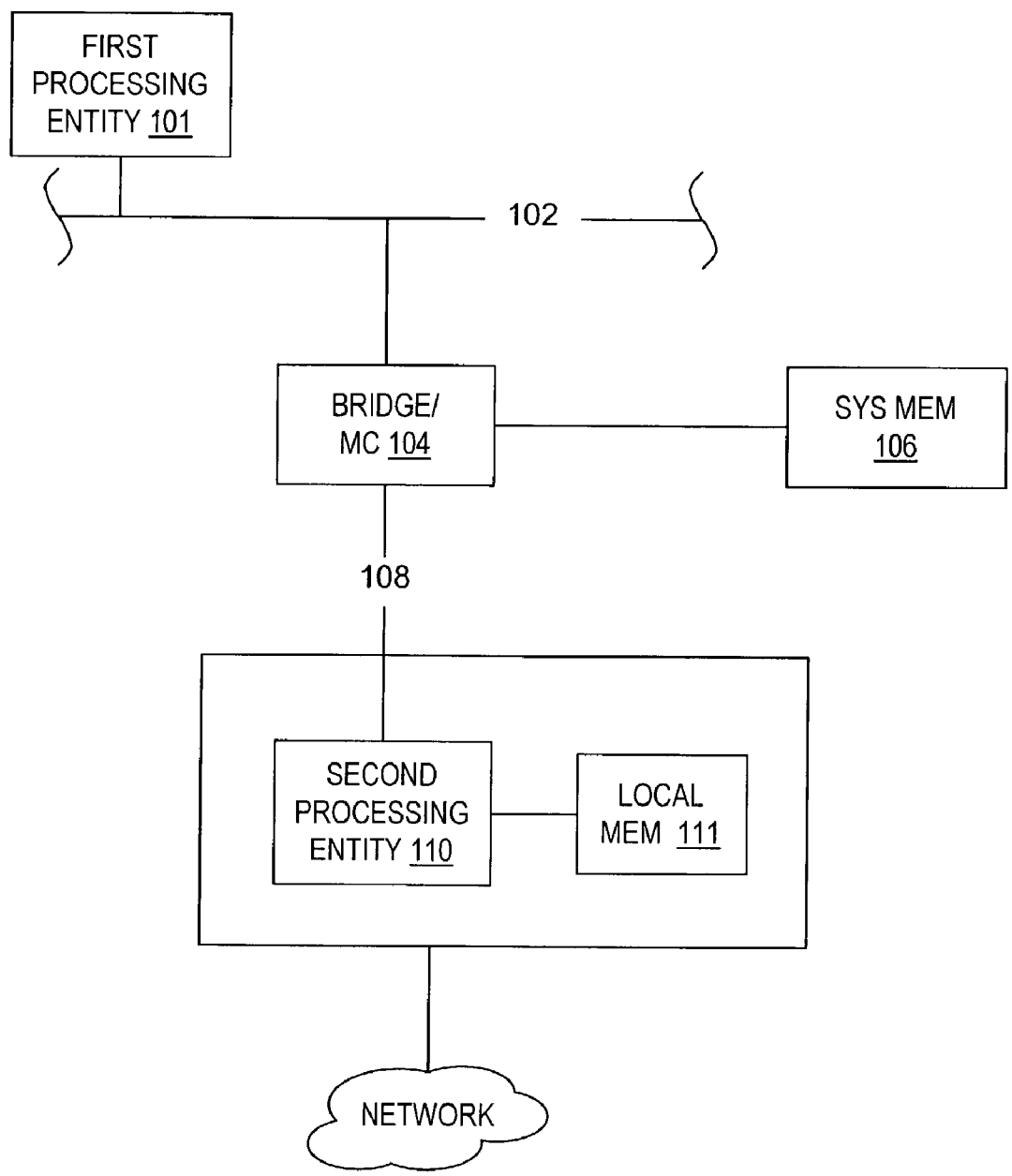
FIG. 1 is a block diagram of selected elements of a data processing system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a data processing system and method in which multiple processing entities are employed in the network communication process by configuring a first processing entity, such as a CPU, to perform a first portion of the network communication process, a second processing entity, such as a NIC, to perform a second portion, and so forth. The system is configured to enable the first and second processing entities to access data in the system memory that is subject to transmission over the network and to format the retrieved data according to the network communication protocol. The first processing entity may be primarily responsible, as an example, for communication flow control and the corresponding construction or generation of all or some of the packet header fields. The second processing entity may be responsible for retrieving data from system memory and assembling the retrieved data and header fields into a protocol compliant packet. In one embodiment, the second processing entity can buffer transmitted packets in its local memory, reclaiming this storage as acknowledgements are received. In another embodiment, the second processing entity can treat its memory as a scratch buffer, constantly overwriting it with packets that are about to be transmitted. In this case, the second processing entity will manage the system memory by marking an area as busy after transmitting a packet, and reclaiming the area when delivery of the packet is acknowledged.

Turning now to the drawings, FIG. 1 is a block diagram of selected elements of a data processing system 100 emphasizing the distributed protocol processing contemplated herein. Data processing system 100 includes multiple processing-capable elements referred to herein as processing entities, each of which has independent access to a system memory 106. In the depicted embodiment, the processing entities include a first processing entity 101, such as a general purpose microprocessor (CPU), connected to system memory 106 via a system bus 102 and a second processing entity 110, such as a network interface card (NIC) or other network communication device, connected to system memory 106 via an I/O bus 108 and an intervening bridge and memory controller 104. As will be described in greater detail below, I/O bus 108 may be implemented as a shared bus or as a switched bus.

Data processing system 100 is connected to a network (not depicted) and is configured to generate network packets suitable for transmission over the network in compliance with some form of network communication protocol. In one embodiment, first processing entity 101 is configured to perform at least a portion of the protocol processing necessary for system 100 to generate packets in response to network requests. The protocol used for communication over the network that connects to data processing system 100 is typically TCP/IP. This protocol provides reliable, stream-oriented connections using IP packets. The TCP/IP communication protocol is characterized by at least three essential features, namely, flow control, packet acknowledgement, and packet retransmissions. Acknowledgement processing enables the transmission of new data, and reclaiming the storage area for transmitted data. Flow control uses a collection of algorithms (including a sliding window algorithm) to compute the amount of data that can be outstanding (unacknowledged). Flow control actions are dependent on the receipt of acknowledgements and timeouts. Retransmissions are triggered when the receiver of a packet fails to acknowledge receipt of a packet within a specified time period, or when the receiver informs the sender of a gap in a received packet stream.

In addition to these three features, TCP defines a format for data segments or packets. This format includes a header field and a data field. The header field includes a sequence number, a source port identifier, a destination port identifier, an acknowledgement number, various control bits, a window portion that defines how much data the sender is permitted to send, and a checksum field used, in conjunction with the sequence numbering, to insure reliable transmission. More information on TCP/IP is provided in RFC 793, Internet Engineering Task Force (1981).

In one embodiment, first processing entity 101 is implemented as a general purpose microprocessor (CPU) such as a PowerPC® processor from IBM Corporation or an x86 compatible processor such as the Pentium® family of processors from Intel Corporation while second processing entity 110 represents a microprocessor or microcontroller within a NIC or other suitable network communication device (identified in FIG. 1 by reference numeral 109). Second processing element 110 typically has access to its own local, randomly accessible memory 111 as well as direct access to system memory 106. Thus, first and second processing entities both have direct access to system memory 106.

First processing entity 101 may be responsible for the flow control portion of the network communication protocol. In this embodiment, first processing entity executes a flow control algorithm, such as a congestion avoidance algorithm. A congestion avoidance algorithm determines available network bandwidth by slowly increasing a congestion window that controls how much data is outstanding (unacknowledged) in the network. Based on results of the flow control algorithm, first processing entity 101 may direct second processing entity 110 to compose or assemble a network packet and send it to the appropriate destination.

Second processing entity 110 would then respond to the directive by assembling a packet and transmitting it to the appropriate destination. In one embodiment, acknowledgement processing is delegated to second processing entity 110. In such an embodiment second processing entity 110, upon receiving an acknowledgement corresponding to a previously transmitted packet, permits reclamation of the memory area where the data corresponding to the received acknowledgment was stored (the memory area can be reclaimed only after receipt of the acknowledgement because it may need to be retransmitted). This memory area may be in system memory 106 or in the local memory 111 of second processing entity 110 as described in greater detail below. Regardless of the storage reclamation specifics, second processing entity 110 typically informs first processing entity 101 of the acknowledgement, thereby providing an input to the flow control algorithm. The retransmission portion of the protocol processing may also be handled by first processing entity 101, with directives being sent to entity 110 when a packet needs to be retransmitted. Alternatively, acknowledgement processing and retransmissions are both handled by second processing entity 110 while first processing entity 101 handles flow control.

As alluded to above, storage reclamation can be accomplished in at least two ways. In one embodiment, second processing entity 110 may keep (buffer) a local copy of transmitted data in its local memory 111. When an acknowledgement is received, second processing entity 110 reclaims (i.e., frees) the appropriate portion of local memory 111. This embodiment ensures that first processing entity 101 has continuous access to main storage area 106, but may introduce coherency issues and may require a large local memory 111 thereby undesirably increasing the cost of NIC 109. In a second embodiment suitable for use with a second processing entity 110 with a capacity limited local memory 111, second processing entity 110 maintains packet data in main memory 106. In this embodiment, second processing entity 110 typically employs well known data structures such as circular queues or bitmaps to communicate the areas of main memory 106 that are not available for use by first processing entity 101. Alternatively, the system may employ a special memory controller that provides copy-on-write functionality, thereby providing first processing entity 101 with transparent access to main memory 106.

Entities 101 and 110 can communicate in multiple ways. In one embodiment, when first processing entity 101 wants second processing entity 110 to transmit a packet, it does so by communicating the packet header to 110 along with information about where the data for the packet resides. In this case, since the header checksum is based on the data, second processing entity 110 computes the checksum. In another embodiment, first processing entity 101 provides second processing entity with pointers to the connection state and the data. In this embodiment, second processing entity 110 composes the entire packet (including the header) for transmission. Similarly, when an acknowledgment is received, second processing entity 110 may perform storage reclamation actions and simply pass the acknowledgement to entity 101. Alternatively, entity 110 may direct 101 to perform specific flow control actions.

In the above explanation, entities 101 and 110 execute different portions of the protocol processing. We have also outlined different embodiments exploring different sharing of protocol processing responsibilities. The specific distribution of responsibilities depends on the processing capabilities of the entities. Moreover, a system may choose to have more than two entities.

In one embodiment of the invention, first processing entity 101 is responsible for generating the header portion of each packet transmitted from the system. In a slightly modified embodiment, first processing entity 101 is responsible for all fields of the header except the checksum. It may be beneficial to delegate the creation of the checksum to a processing entity where the data portion of the packet and the header portion are combined since the checksum value cannot be computed until the contents of the header field and data field are known. This union of data and header typically occurs at the NIC or other similar device. Accordingly, it may be beneficial to configure the NIC to create the checksum once the remainder of the packet is known. Thus, in one embodiment, the second processing entity 110 represents the NIC or other suitable network communication device. The second processing entity 110 may be responsible for retrieving the data portion of the packet from system memory 106 via its direct memory access (DMA) capabilities. In addition, the second processing entity may be configured to generate at least a portion of the header portion of the packet. More specifically, the second processing entity 110 may be configured to generate a checksum after the remainder of the header and data have been retrieved. To facilitate calculation of the checksum, one embodiment of the invention incorporates dedicated hardware or circuitry designed specifically to calculate the checksum based on the values of the remaining fields in a packet.

Figure 2:
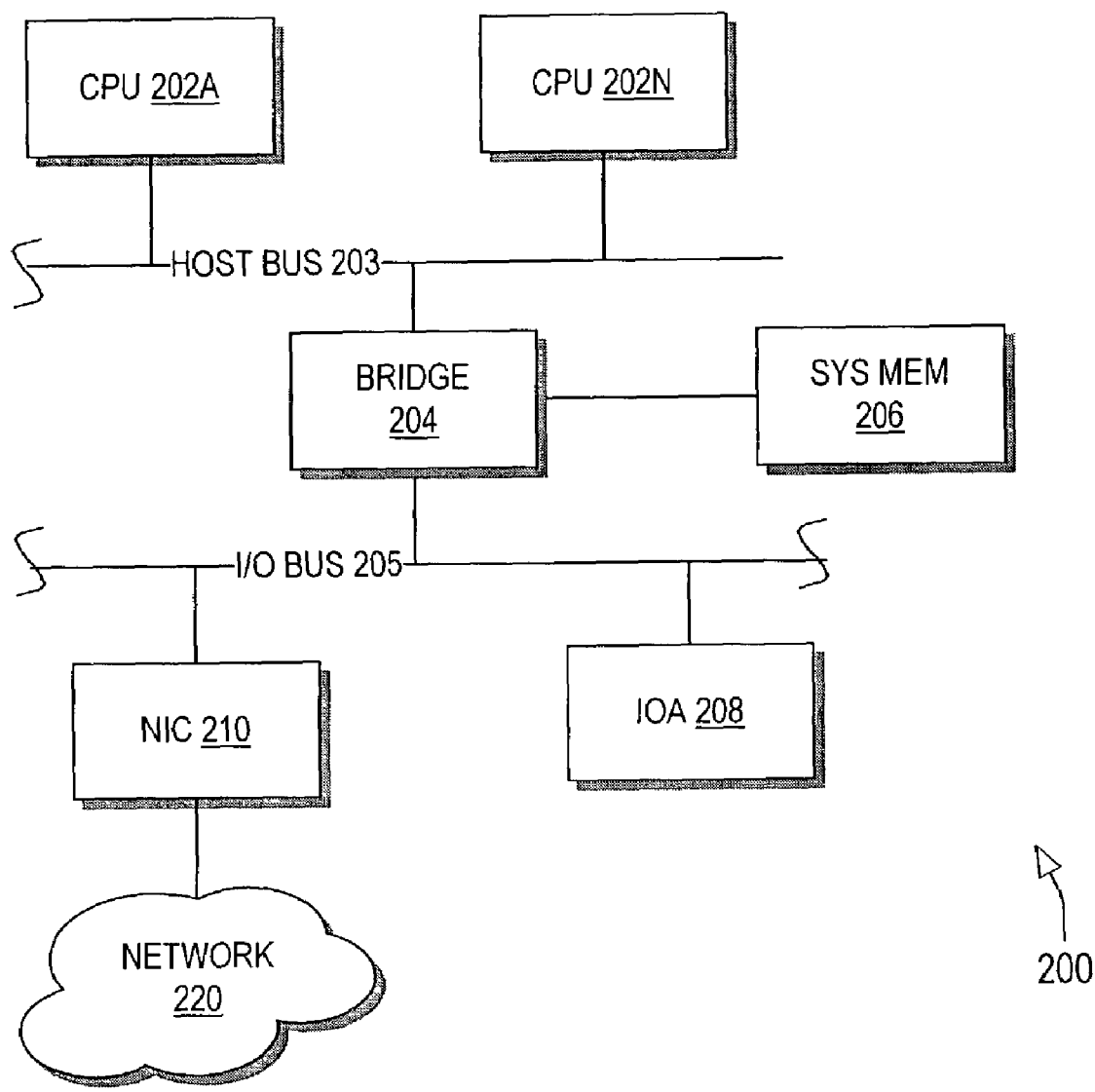
FIG. 2 is a block diagram of selected elements of a bus-based embodiment of the data processing system of FIG. 1.

Turning now to FIG. 2, a block diagram of selected elements of a data processing system 200 according to one embodiment of the invention is depicted. This embodiment of system 200 emphasizes a tightly coupled system in which the first and second processing entities reside on a single server or other comparable system. System 200 as depicted in FIG. 2 represents an implementation of system 100 employing a traditional bus-based architecture that will be familiar to those in the field of microprocessor based system design. More specifically, system 200 as depicted in FIG. 2 includes one or more general purpose CPUs 202A through 202N (generally or collectively referred to as CPU(s) 202). Each CPU 202 is connected to system memory 206 via a host bus 203. A bridge/memory controller 204 connects an I/O bus 205 to host bus 203 and system memory 206.

A NIC 210 is connected between a network represented by reference numeral 220 and I/O bus 205. In this embodiment, CPUs 202 may be responsible for generating packets and sending them to NIC 210 for transmission to client systems. NIC 210 includes a processor and buffer space memory not explicitly depicted in the figure. NIC 210 may be configured to intercept acknowledgements from client systems and to retransmit packets or reclaim memory occupied by packets depending upon the content of the acknowledgement.

Clients may request information that is stored in system memory 206 and that does not require further processing. A static web page, for example, may reside entirely within the system memory 206. In such situations, processors 202 may delegate the data retrieval to NIC 210 when responding to a client request. In this embodiment, one or more of the CPU's 202 may send NIC 210 information (such as a pointer) indicating where the requested data resides. While processor (s) 202 construct an appropriate packet header based on the results of a flow control algorithm, NIC 210 can retrieve the requested data directly from system memory 206. After the header is constructed, processor(s) 202 can forward the header to NIC 210 where it is combined with data retrieved from system memory 206 and stored in the NIC buffers. NIC 210 may then compute a checksum based on the header and data contents, store the checksum value in the header, and transmit the packet to the client. In an embodiment in which it is desirable to minimize even further the protocol processing delegated to CPU's 202, CPU 202, instead of generating the header information itself, may send information necessary to construct the header to NIC 210 so that the NIC can construct the packet header locally.

Figure 3:
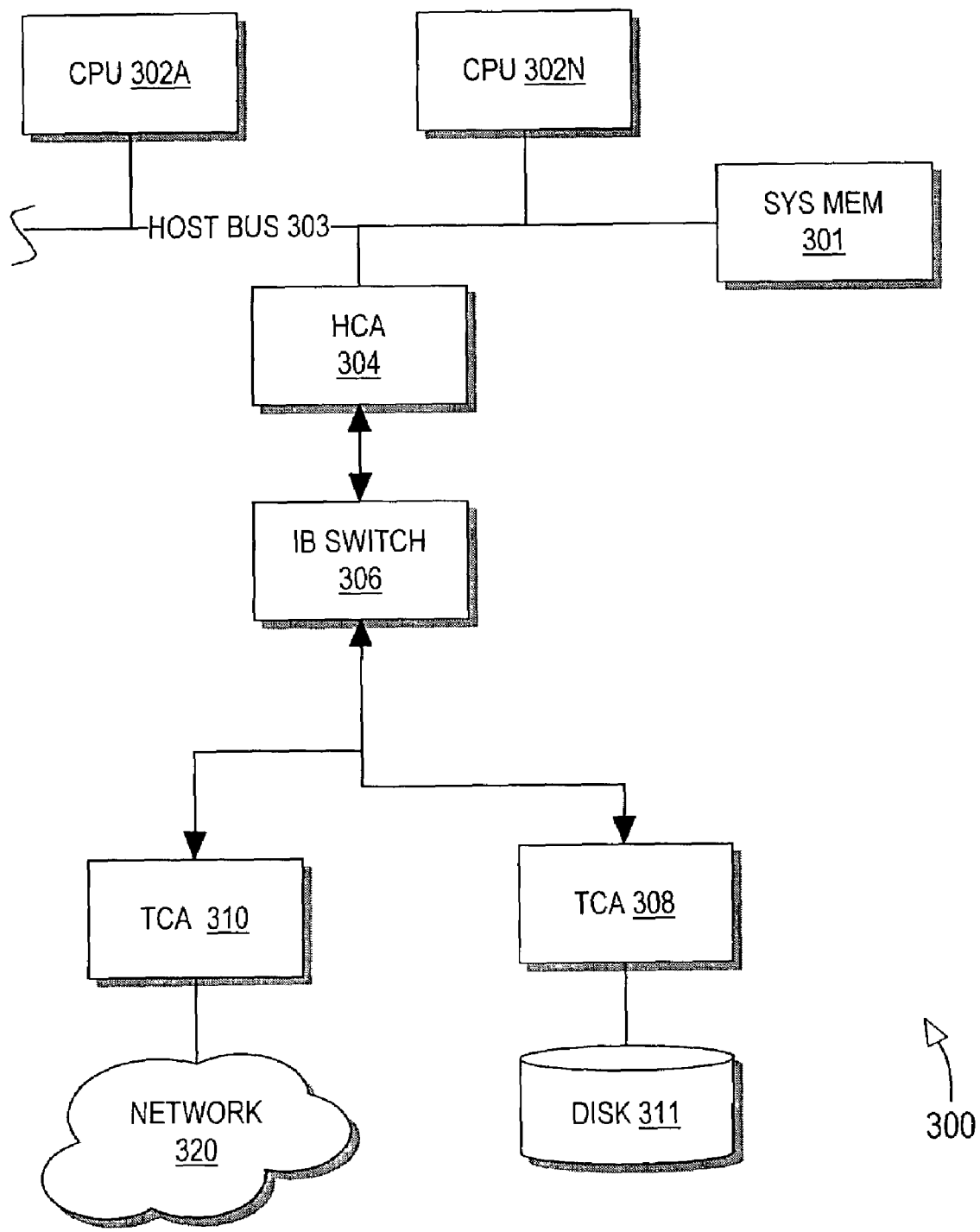
FIG. 3 is a block diagram of selected elements of a switched bus embodiment of the data processing system of FIG. 1.

Turning now to FIG. 3, an embodiment of the invention emphasizing a loosely coupled implementation of the present invention in which the first and second processing entities reside on distinct physical devices. The depicted embodiment implements a switched bus architecture in which CPU's 302a through 302n communicate with peripheral devices or target channel adapter's (TCA's) 308 and 310 through an intervening switch 306. This implementation is exemplified by the Infiniband architecture that will be familiar to those knowledgeable in emerging I/O bus architectures. In the depicted embodiment, CPU's 302 are suitable for use as the first processing entity while TCA 310 represents the second processing entity. TCA 310 is an Infiniband-compatible network communication device. In some implementations, the switched bus I/O architecture permits the target adapters to reside hundreds of meters from the host channel adapter (HCA) 304, which interfaces CPU's 302 to switch 306. Switch 306 is configured to provide point-to-point communication channels between a host and a target that are connected to it.

In conjunction with the present invention, system 300 represents a system in which a first processing entity residing on a first device, such as a server box, performs a flow control portion of the network communication protocol. A second processing entity, such as a network communication TCA residing on a second physical system is configured to perform a second portion of the protocol processing such as acknowledgement processing or retransmission processing. CPU's 302 and TCA's 308 and 310 both have access to system memory 301 as well as to a networked mass storage device represented by disk 311 via the switched network. This loosely coupled implementation further emphasizes the distributed network protocol processing contemplated by the present invention.

It will be apparent to those skilled in the art having the benefit of this disclosure that the present invention contemplates a system and method for distributing network protocol processing in a data processing system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system suitable for transmitting and receiving data packets via a network, comprising:
   a first processing entity configured to perform a first portion of a network communication protocol including a flow control portion of the protocol;

a second processing entity communicatively connected to the first processing entity and configured to perform a second portion of the network communication protocol including an acknowledgement handling portion of the protocol; and means for the first and second processing entities to access a system memory storing data subject to transmission over the network after being configured to the network communication protocol; and means for retrieving data from the system memory and configuring the retrieved data according to the protocol, wherein the means for configuring the retrieved data includes:

first processing entity means for determining a header portion of a protocol compliant packet and forwarding the determined header to the second processing means; and second processing entity means for retrieving the data from the system memory, combining the retrieved data with the determined header, calculating a checksum based on the contents of the data, and including the calculated checksum in the header.

2. The system of claim 1, wherein the first processing entity comprises a central processing unit of a network server.

3. The system of claim 2, wherein the second processing entity comprises a network communication device of the server.

4. The system of claim 1, wherein the first and second processing entities reside on a single physical system.

5. The system of claim 4, wherein the first and second processing entities are connected via a shared bus.

6. The system of claim 1, wherein the first and second processing entities reside on distinct physical systems.

7. The system of claim 6, wherein the first and second processing entities are connected via a switched, point-to-point bus.

8. The system of claim 1, wherein the flow control portion of the protocol comprises a congestion avoidance algorithm.

9. The system of claim 1, wherein the acknowledgement handling portion includes reclamation of memory corresponding to an acknowledged packet.

10. A method of implementing a network communication protocol, comprising:

performing with a first processing entity of the network, a first portion of the network communication protocol to generate network protocol information;

providing the network protocol information to a second processing entity communicatively connected to the first processing entity, wherein the second processing entity is configured to perform a second portion of the network communication protocol; and retrieving data from the system memory and configuring the retrieved data according to the protocol:

wherein the first protocol portion includes a flow control portion of the protocol and wherein the second protocol portion includes an acknowledgement handling portion of the protocol;

wherein the acknowledgement handling portion includes reclamation of memory corresponding to an acknowledged packet.

11. The method of claim 10, wherein the first processing entity comprises a central processing unit of a network server.

12. The method of claim 11, wherein the second processing entity comprises a network communication device of the server.

13. The method of claim 10, wherein the first and second processing entities reside on a single physical system.

14. The method of claim 13, wherein the first and second processing entities are connected via a shared bus.

15. The method of claim 10, wherein the first and second processing entities reside on distinct physical systems.

16. The method of claim 15, wherein the first and second processing entities are connected via a switched bus.

17. The method of claim 10, wherein the flow control includes a congestion avoidance algorithm.

18. The method of claim 10, wherein configuring the retrieved data includes:

determining with the first processing means a header portion of a protocol compliant packet and forwarding the determined header to the second processing means; and retrieving with the second processing means the data from the system memory, combining the retrieved data with the determined header, calculating a checksum based on the contents of the data, and including the calculated checksum in the header.

19. A method of implementing a network communication protocol, comprising;

performing with a first processing entity of the network, a first portion of the network communication protocol to generate network protocol information;

providing the network protocol information to a second processing entity communicatively connected to the first processing entity, wherein the second processing entity is configured to perform a second portion of the network communication protocol; and retrieving data from the system memory and configuring the retrieved data according to the protocol;

wherein the first protocol portion includes a flow control portion of the protocol and wherein the second protocol portion includes an acknowledgement handling portion of the protocol;

wherein configuring the retrieved data includes:

providing with the first processing means header information to the second processing moans wherein the provided header information is sufficient to generates a protocol compliant header field; and generating with the second processing means the header field from the header information, retrieving the data from the system memory, combining the retrieved data with the generated header, calculating a checksum based on the contents of the data, and including the calculated checksum in the header.

* * * * *